Dec. 10, 1957          A. W. DINGER          2,815,580
INSTRUMENT FOR TESTING ROTATION OF CONICAL WHEELS
Filed Sept. 19, 1955
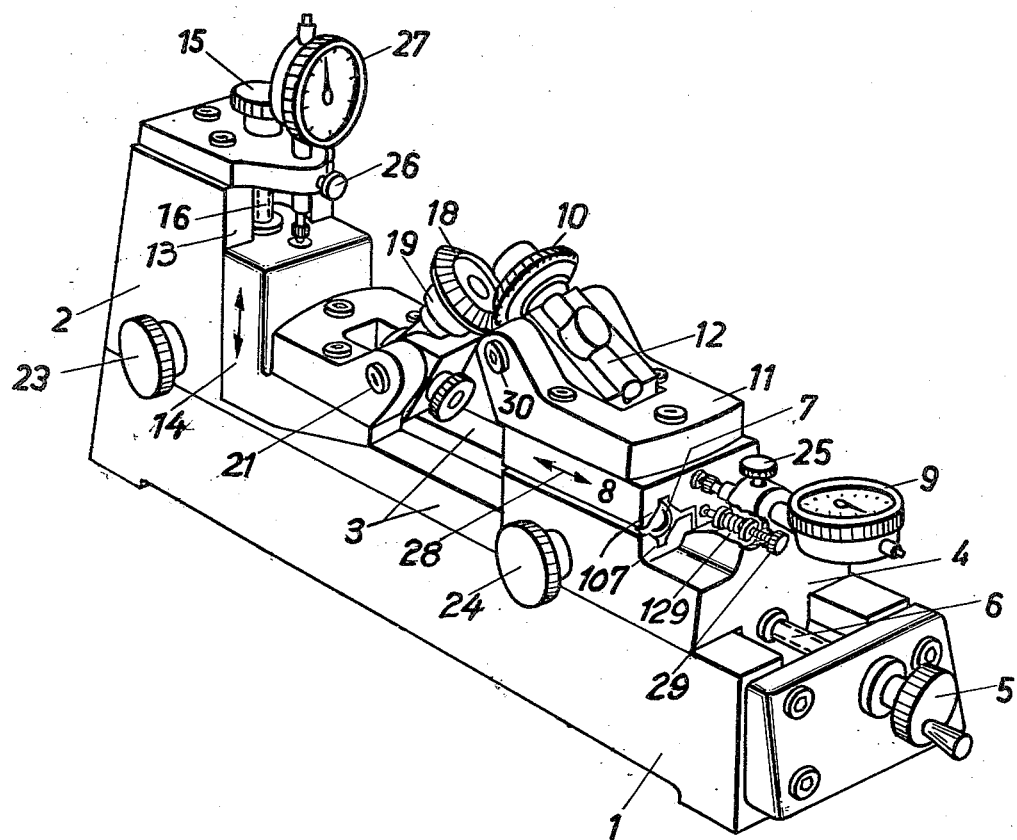

United States Patent Office 2,815,580
Patented Dec. 10, 1957

2,815,580

INSTRUMENT FOR TESTING ROTATION OF CONICAL WHEELS

Alfons Willy Dinger, Minden, Westphalia, Germany, assignor to Schoppe & Faeser G. m. b. H., Minden, Westphalia, Germany, a limited liability company of Germany Application September 19, 1955, Serial No. 535,170

Claims priority, application Germany September 28, 1954

6 Claims. (Cl. 33—179.5)

This invention relates to instruments for rotary testing of cone wheels or gears. Such instruments are used in the control or determination of inaccuracies attending the manufacture of cone wheels.

A cone wheel to be tested and a master wheel of suitable accuracy are set in the instrument, which does not interfere with their ability to rotate, and by the shifting of one or both wheel bearings the wheels are brought into mesh.

The bearing or location of one of the wheels is shiftable or displaceable during the test procedure. On this shiftable bearing there is exerted a force in the direction of shaft by means of a spring or suitable means so that the wheel on this bearing stays in engagement or mesh with the other wheel. One of the wheels is now rotated, so that the two wheels rotate upon each other. According to the amount of inaccuracy in the wheels, the shiftably mounted wheel shifts back and forth. This shifting is indicated or registered and discloses details of error or irregularity. Then too, two wheels which are to work together, in a machine, may be allowed to wear down running against each other in the instrument.

An object of the invention is to increase the accuracy of measurement, and to simplify the justification, of such wheels.

According to the invention the wheels are so arranged that the measured shifting or displacement is perpendicular to the common cone mantel line of the two cone wheels.

The drawing shows a perspective of an example of an instrument according to the invention, including a bed 1 on one end of which is a head stock 2. The bed includes slide rails 3 on which a sliding carriage 4 is mounted for horizontal movement longitudinal to the bed, the carriage being movable to a fixed position by means of a hand wheel 5 mounted upon a threaded spindle 6, in a known manner. The carriage 4 in turn carries, upon glide balls 7, a measuring slide member 8, movable only toward and from the head stock or longitudinal to the bed rails. The displacement or shifting of the slide member relative to the carriage 4 is measured by a sensitive meter 9. A spring 129 which is adjustable by means of the screw 29, urges the slide member 8 toward the head stock and toward the left as shown in the drawing. The balls 7 are contained in upper and lower grooves 107 in the slide member 8 and the carriage 4 respectively to prevent lateral movement to the slide member.

The measuring slide member 8 carries a wheel, say the wheel 10 to be tested, the wheel being so carried that its axis can be inclined in a vertical plane. This is accomplished by a yoked part 11 substantially fast on the slide member 8 and carrying a horizontal bolt 30 about which the bearing pin for the toothed wheel 10 is rotatable. The bolt serves too, in a known manner, to lock the pin and wheel in position when desired.

The head stock 2 carries vertical slide rails 13 on which a vertically slidable member 14 can be moved in a vertical direction. This slidable member 14 can also be set in position by a hand wheel 15 and spindle 16 and movement can be indicated on the sensitive measuring meter 27. On the vertically slidable member 14 is the second cone wheel 18, say the master wheel, likewise mounted on an axle member 19 which can also be swung in a vertical plane about a bolt 21 carried on the member 14 as is the bolt 30 on the part 11. Two clamping screws 23 and 24 serve to make fast in position the member 14 and the carriage 4 respectively. The meters 9 and 27 are lightly clamped fast in their supports by means of set screws 25 and 26. The master and test wheels may, of course, be interchanged.

When carrying out the measurement it is necessary that first the cone wheels are brought into correct engagement, i. e. the wheels must have their teeth engage so that there is engagement along a common mantle line substantially the length of the intended working surfaces. In other words the wheels must be, in effect, positioned so that part of a tooth on one wheel fits between correspondingly high parts of the teeth on the other wheel. In the form of the invention shown in the drawing where the movement measured by meter 9 is horizontal movement and must be perpendicular to common mantle line, the wheels are swung about the bolts 21 and 30 to positions where their pitch surfaces engage vertically parallel planes and appear to have their teeth approximately engageable with each other if sufficiently near to each other. Then carriage 4 is shifted to the left by means of hand wheel 5 and spindle 6 until the tooth wheels engage. The carriage 4 below the slightly shiftable carriage 8 is moved somewhat to the left and the spring 129 pressed together. By means of spindle 16 in the slide rails 13 and operating the hand wheel 15 and spindle 16 the slidable member 14 is brought in that vertical position in which the slide member 8 being pressed to the left by spring 129 is at the maximum left position. This position can be read off the meter 9. In this position the cone wheels are at a minimum distance from each other and are correctly positioned for the rotary testing of cone wheels. Owing to the fact that the teeth of both wheels become lower towards the apex, the teeth force the wheels apart if the position of optimum engagement is left, i. e. if the slidable member 14 is positioned too high or too low. For these reasons the slide member 8 is in both cases farther to the right than in the optimum position of engagement. In this manner the adjustment of the optimum position of the cone wheels for rotary testing is rendered considerably easier as compared with the instruments of the known construction.

In practice, the wheels are rotated against each other by a wheel of a device (not shown). By this action, the wheel 10, being mounted for longitudinal movement, more or less moves back and forth in the direction of the double arrow 28, according to the inaccuracies in the wheel. This movement is indicated or registered on the meter 9 and discloses the details of error. The angle between the cone gear axes remains the same during the testing operation.

The invention claimed is:

1. A method for determining optimum position of cone gear wheels, comprising mounting two cone gear wheels respectively on first and second substantially axially coplanar axles and bringing the wheels into approximate engagement; applying a steady force to the first axle along a line in the plane of the axes of the axles and substantially perpendicular to the common mantle line; simultaneously translating the second axle in a direction parallel with that of the cone mantle line, and registering the distance between axles.

2. In a cone gear testing instrument, two axially coplanar axle members for mounting gears thereon for mutual engagement; means for mounting one of the members for movement in a direction along a given line; means for mounting one of the members for movement along a line perpendicular to the given line, and means for mounting the members to swing in their common plane so that engaged cone gears on the axle members may have their common mantle line parallel with the given line, means for urging the members together along the perpendicular line, and means for indicating movement of the members toward each other along the perpendicular line.

3. In an instrument for testing cone gears in which two gears rotate freely against each other, and are urged together, two axially coplanar axle members inclined toward each other for carrying the gears, the axes of the members meeting at an angle, means mounting one of the members for movement only in a direction substantially parallel with a line dividing said angle and means for mounting the other member for movement in a direction substantially perpendicular to said line.

4. An instrument as claimed in claim 2 and means for indicating the amount of the last mentioned movement when the gears are on the members and in engagement with each other and said one member moved in a direction parallel with said line.

5. In an instrument as claimed in claim 2, one of said gears being a standard cone gear on one of the axle members and having an element of its mantle surface parallel with the given line.

6. In a cone gear testing instrument, two axially coplanar axle members for mounting gears thereon for mutual engagement; means for mounting one of the members for movement in a direction along a given line; means for mounting one of the members for movement along a line perpendicular to the given line, and means for mounting the members to swing in their common plane to positions where cone gears on the members each has a mantle line parallel with the given line, means for urging the members together along the perpendicular line, and means for indicating movement of the members toward each other along the perpendicular line.

References Cited in the file of this patent

UNITED STATES PATENTS

| 2,447,445 | Wilden | Aug. 17, 1948 |
| 2,348,712 | Dahlerup | May 12, 1949 |
| 2,689,410 | Beam | Sept. 21, 1954 |

FOREIGN PATENTS

| 13,465 | Great Britain | 1911 |